United States Patent
Barford et al.

(10) Patent No.: US 8,065,722 B2
(45) Date of Patent: Nov. 22, 2011

(54) SEMANTICALLY-AWARE NETWORK INTRUSION SIGNATURE GENERATOR

(75) Inventors: Paul Robert Barford, Madison, WI (US); Jonathon Thomas Giffin, Madison, WI (US); Somesh Jha, Madison, WI (US); Vinod Trivandrum Yegneswaran, Foster City, CA (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1081 days.

(21) Appl. No.: 11/085,633

(22) Filed: Mar. 21, 2005

(65) Prior Publication Data

US 2006/0212942 A1 Sep. 21, 2006

(51) Int. Cl.
*G06F 9/00* (2006.01)
*G06F 15/16* (2006.01)
*G06F 17/00* (2006.01)

(52) U.S. Cl. ........ 726/14; 713/176; 713/188; 713/189; 709/223; 709/224; 709/225; 726/1; 726/3; 726/11; 726/13; 726/22; 726/23; 726/24; 726/25; 370/229; 370/230; 370/231; 370/235; 370/250; 370/252; 370/253; 370/389; 370/392; 370/401; 370/470; 370/476; 370/472; 370/474; 370/506

(58) Field of Classification Search .......... 726/24; 736/24

See application file for complete search history.

(56) References Cited

U.S. PATENT DOCUMENTS

| | | | |
|---|---|---|---|
| 7,496,962 B2* | 2/2009 | Roelker et al. | 726/23 |
| 2004/0025044 A1* | 2/2004 | Day | 713/200 |
| 2004/0174820 A1* | 9/2004 | Ricciulli | 370/245 |
| 2005/0050353 A1* | 3/2005 | Thiele et al. | 713/201 |
| 2005/0281291 A1* | 12/2005 | Stolfo et al. | 370/506 |
| 2006/0107321 A1* | 5/2006 | Tzadikario | 726/22 |

* cited by examiner

*Primary Examiner* — Nathan Flynn
*Assistant Examiner* — Bryan Wright
(74) *Attorney, Agent, or Firm* — Boyle Fredrickson, S.C.

(57) ABSTRACT

An automatic technique for generating signatures for malicious network traffic performs a cluster analysis of known malicious traffic to create a signature in the form of a state machine. The cluster analysis may operate on semantically tagged data collected by connection or session and normalized to eliminate protocol specific features. The signature extractor may generalize the finite-state machine signatures to match network traffic not previously observed.

19 Claims, 2 Drawing Sheets

SEMANTICALLY-AWARE NETWORK INTRUSION SIGNATURE GENERATOR

STATEMENT REGARDING FEDERALLY SPONSORED RESEARCH OR DEVELOPMENT

This invention was made with United States government support awarded by the following agencies: ARMY DAAD19-02-1-0304 and NAVY N00014-01-1-0708. The United States has certain rights in this invention.

CROSS-REFERENCE TO RELATED APPLICATIONS

Background of the Invention

The present invention relates to security for computer networks and, in particular, to a method and apparatus for generating signatures useful in identifying malicious network traffic.

Computer networks are increasingly subject to attacks from malicious network traffic containing software (exploits), such as "worms", which steal processing time on individual computers to further propagate the worm to other computers on the network. Worms disrupt the network and may damage programs and data on the computers.

Referring to FIG. 1, a general network 10 may connect to other "external" networks 12 such as the Internet, through a network connection 14 having a network address. Data packets 16 may be exchanged between two computers in networks 12 and 10 according to a number of well-known protocols by establishing a session. A session 20 typically involves a sequence of one or more connections 18 between computers during which numerous packets 16 may be exchanged.

Security for network 10 may be provided by a "network intrusion detection system" 22 (NIDS) which monitors the packets 16 flowing between the networks 10 and 12 and which may compare the data of the packets 16 to stored "data signatures" 23 which hold patterns of data associated with malicious network traffic. When a packet 16 received by the NIDS 22 matches a stored signature 23, an alert is produced on an output 24 to notify the system administrator, to enable blocking features in firewall 26, or the like.

Many types of malicious network traffic exist associated with different security weaknesses in different types of operating system and network software. Each type of malicious network traffic may also have different variants representing often trivial modifications to the data of the malicious network traffic intended to defeat signature-based NIDS. Variants are constantly evolving and for this reason, signatures to detect malicious network traffic must be constantly updated.

Creating signatures 23 for an NIDS is typically a manual operation, often requiring a skilled programmer to review the data of malicious network traffic to isolate distinctive data patterns associated with malicious network traffic and importantly not found in benign network traffic.

Samples of malicious network traffic can be obtained through the use of a "honeypot" (a dummy computer) or a "honeynet" (a dummy network) set up to simulate a target for malicious network traffic. The honeypots are connected to network "darkspace" being network addresses unused by legitimate networks and thus largely free of benign network traffic.

The burden of generating signatures from the wide variety of constantly changing malicious traffic can be reduced by automatic signature generation techniques. This approach is limited by the difficulty of identifying signature data in the malicious traffic that would not be found in benign network traffic. Signatures generated by automatic techniques frequently cause excessive false negatives (misdetection of malicious network traffic as benign) and/or false positives (mis-identification of benign network traffic as malicious). A high incidence of false positive or negative identifications renders the signatures ineffective when large amounts of network traffic must be screened. Signatures automatically generated from specific malicious network traffic are often less effective than manually generated signatures in detecting new variants of the malicious network traffic.

SUMMARY OF THE INVENTION

The present invention provides an improved method for automatic signature generation. The method may collect malicious traffic in darkspace addresses and captures multi-packet samples connections and/or sessions. These packet sequences can then be aggregated, normalized and labeled with protocol-specific context. This semantically-aware transformation of packet sequence data allows more sophisticated detection of malicious network traffic.

Cluster analysis may be performed on the transformed sequence data. Cluster analysis, by comparing similar variants of malicious network traffic, helps isolate the essential features that make the traffic malicious. This allows general signatures to be produced that result in very low false alarm rates. The signatures may be expressed as finite-state machines for compactness and to allow identification of many variants, possibly including future variants, on the sampled malicious traffic.

Specifically, the present invention provides a signature generator creating signatures identifying malicious network traffic and including a network connection for receiving data from network darkspace and a cluster analyzer for grouping darkspace data into similar clusters. A signature extractor operates on at least one cluster to extract a signature representative of the darkspace data of the cluster.

Thus, it is one object of at least one embodiment of the invention to provide an improved method of automatically generating signature data. Tapping into network darkspace provides a rich source of easily identified malicious network data while the cluster analysis allows the core features of the malicious network traffic to be isolated.

A wide variety of different cluster algorithms may be used, including star clustering, k-means, and hierarchical algorithms. Likewise, a variety of distance and similarity metrics, including cosine similarity and hierarchical edit distance, may be used.

Thus it is another object of at least one embodiment of the invention to provide a system that has modular features allowing it to take advantage of different or improved cluster analysis techniques.

The signature extractor may operate only on clusters exceeding a predetermined threshold size.

Thus it is another object of at least one embodiment of the invention to eliminate small amounts of benign network traffic which do not form substantial clusters.

In addition or alternatively, the invention may include an aggregator collecting multiple data packets into communication units representing associated data packets under a communication protocol. The communication units may, for example, be connections or sessions under the protocol.

Thus it is another object of at least one embodiment of the invention to provide a semantically aware signature generator that can look at the context of the data packets within the protocol as well as the content of those packets and thereby provide improved signature generation particularly for multistep attacks where the critical data is a relatively small part of a subset of the packets exchanged in the session.

The data packets are organized into communication units representing both session and connection data packets, both of which may be analyzed and compared to produce the signatures.

Thus it is another object of at least one embodiment of the invention to provide an expanded contextual understanding of the network traffic by looking at both the connection and session level to improve the generation of signatures.

The signature extractor may create a finite-state machine describing the communication units and the extracted signatures may be finite-state machines.

Thus it is another object of at least one embodiment of the invention to provide an extremely compact and flexible way of expressing signatures particularly when the signature relates to multiple data packets.

The signature extractor may replace state transitions having variability over a predetermined amount with wildcard state transitions that match any network traffic to produce the signature finite-state machines.

Thus it is another object of at least one embodiment of the invention to provide signatures that may generalize over many variations of a single type of malicious network traffic.

The network connection may operate according to a predetermined protocol. The signature generator may include a semantic encoder that identifies protocol elements according to the predetermined protocol.

Thus it is another object of at least one embodiment of the invention to identify protocol elements in data collected by the honeynet using knowledge of the network protocol monitored by the honeynet, and to use these elements when clustering data.

The semantic encoder may weight data according to the significance of its content in the communication, and the weights may be considered when establishing the clusters.

Thus it is another object of at least one embodiment of the invention to allow a priori judgments as to the significance of particular data, for example, by assigning low weights to time stamp sequence numbers and proxy cache headers which cannot be readily modified to hold a malicious exploit.

The invention may include a disambiguater. The task of this component is to resolve ambiguities in the data packets received from darkspace, for example, by removing data packets with errors, reordering the data packets according to packet sequence, and discarding duplicate packets.

Thus it is another object of at least one embodiment of the invention to preprocess the darkspace data packets to remove simple obfuscation often used by authors of malicious network traffic.

These particular objects and advantages may apply to only some embodiments falling within the claims and thus do not define the scope of the invention.

DETAILED DESCRIPTION OF THE PREFERRED EMBODIMENT

Figure 1:
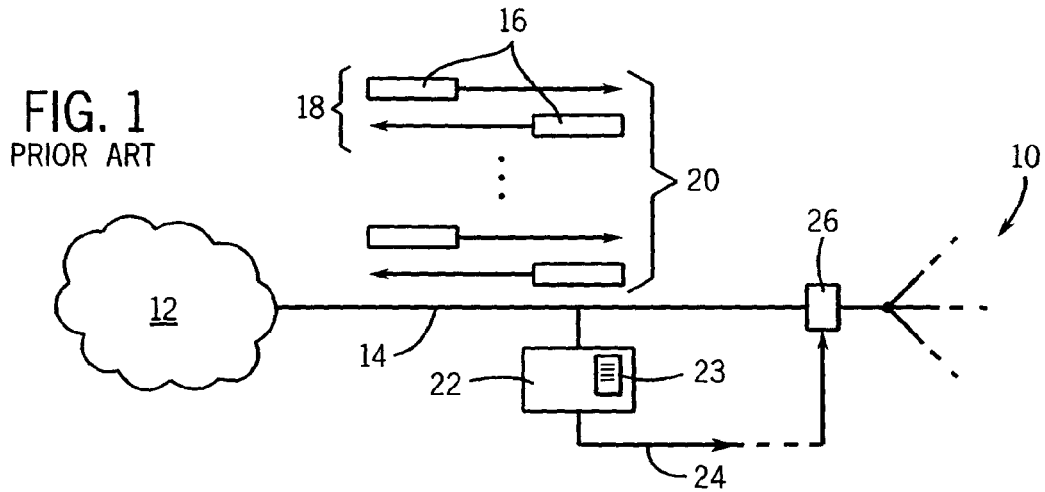
FIG. 1 is a diagram of a network interface and network intrusion detection system (NIDS) connecting two networks in the prior art and also useful in the present invention.
Figure 2:
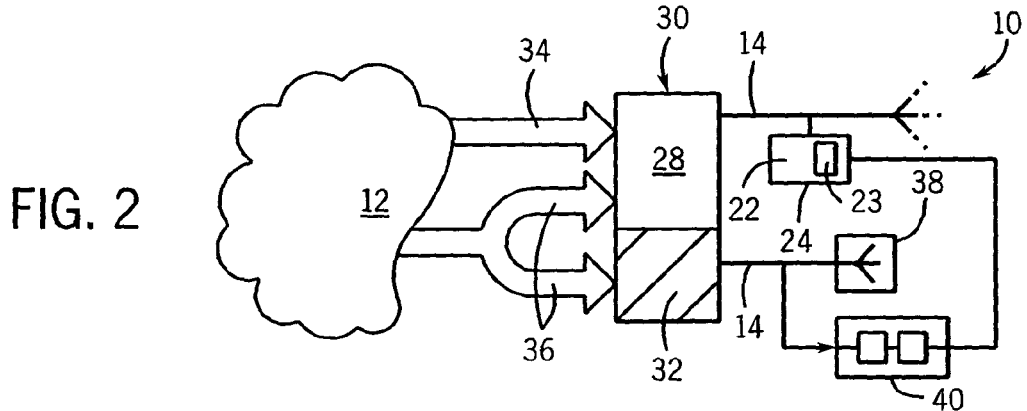
FIG. 2 is an expanded view of the network interface of FIG. 1 in the context of an address space and showing the signature generator of the present invention connecting to network darkspace.

Referring now to FIG. 2, the network 12 may communicate with the network 10 at one or more addresses in an address space 30, for example, the address space of the Internet. The address space 30 includes "brightspace" addresses 28 currently used by standard network computers and "darkspace" addresses 32 currently unused by standard network computers. The brightspace addresses 28 will receive both legitimate traffic 34 and malicious traffic 36 while the darkspace addresses 32 will receive predominantly malicious traffic 36.

A real or virtual, honeypot or honeynet 38 may be connected to one or more darkspace addresses 32. For simplicity, only the honeynet 38 will be described. The honeynet 38 as described above presents a facade to the network 12 having the appearance of a standard interface to a functioning network, and yet as a simulation, the honeynet 38 is not susceptible to conventional attacks. Typically the honeynet 38 will be isolated from a real network 10 and will implement a specific protocol (e.g. session-layer protocols such as NetBios and RPC and application-layer protocols such as Telnet and HTTP) to simplify the contextual analysis performed by the present invention as will be described below.

The present invention provides a signature generator 40 monitoring the traffic received by the honeynet 38 from darkspace addresses 32. By monitoring communications at darkspace addresses 32 the signature generator avoids the problem of filtering out large amounts of legitimate traffic 34 to obtain samples of malicious traffic 36 for signature generation. The signature generator 40 analyzes the malicious traffic 36 and creates signatures 23 that may be used to identify the malicious traffic 36. The signatures 23 may be provided to NIDS 22 monitoring traffic at brightspace addresses 28.

Figure 3:
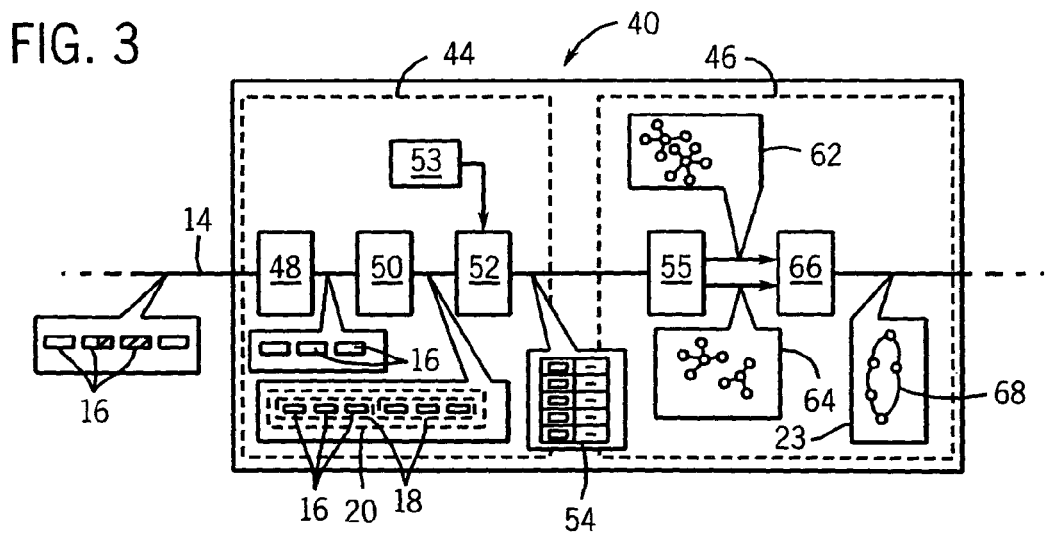
FIG. 3 is an expanded block diagram of the signature generator of FIG. 2 showing its constituent modules and the flow of data packets through the modules.

Referring now to FIG. 3, the signature generator 40 includes a data abstraction component 44 which pre-processes data packets 16 of the malicious traffic 36, and a signature generation component 46 which extracts signatures from the pre-processed data.

Data packets 16 are first received by a disambiguater 48 of the data abstraction component 44. The disambiguater 48 processes the packets 16 to normalize common obfuscation techniques used in the transmission of malicious traffic, such as transport level ambiguities including: the transmission of dummy packets 16 to disguise the exploit, such as packets 16 that are empty, have errors, have been fragmented, or are duplicates, such as would cause them to be ignored by an application layer, or out of sequence packets that would be reordered at a higher level. Some common types of obfuscation are described in *"Insertion, Evasion and Denial of Service: Eluding Network Intrusion Detection"*, by Ptacek et al., Technical Report, Secure Networks, January 1998. The disambiguater 48 may also resolve service (protocol level) ambiguities such as HTTP URL encodings, pipelined connections, and UNC path encodings in NetBIOS/SMB.

Clean packets 16 from the disambiguater 48 are provided to an aggregator 50 which groups the packets 16 according to the rules of the protocol employed by the honeynet 38 into connections 18 and sessions 20. Each connection 18 as is understood in the art is composed of a request and response sequence. A session 20 comprises many connections 18 between a host pair, and in the preferred embodiment is defined to include related connections 18 that have not been inactive for more than a predetermined period of time, for example, one hour.

The packets 16 as collected into connections 18 and sessions 20 are then passed to a semantic encoder 52 which normalizes the data of the packets 16 to a common logical framework to eliminate variations caused by differences among protocols under which the packets 16 are transmitted. This normalization makes use of protocol information 53 specific to the particular protocol executed on the honeynet 38. The result is a structured packet set 54 for each connection and each session holding essential data of the data packets 16 as a communication unit. The structured packet set 54 provides a standardized, largely protocol-independent data structure linking the data of the data packets 16 to their function within the connection and session. Thus, for example, data representing address information, packet sequence number, encrypted fields, proxy cache headers, and time stamps will be provided and identified by these functions. Packet level, connection level, and session level contexts of the data may be preserved in the structured packet set 54. Determining the purpose of the data of the packets 16 and linking this purpose to the data allows later data analysis to be "semantically aware", increasing the sophistication of the later data analysis. Generally, each structured packet set 54 hold data from multiple data packets 16 and includes data from both an attacking computer on network 12 and the response of its intended victim on network 10.

At this time, particular data elements in the structured packet sets 54 may be given weights given their relative importance in the generation of a signature. For example, the URL in an HTTP request may be emphasized by giving it a larger weight, while less important attributes such as the encrypted fields, the proxy cache header, time stamps, and sequence numbers may be de-emphasized by assigning them a smaller weight. These weight values will be used in cluster analysis as will be described below. Independently of the weighting, the abstraction of the data packets into structured packet sets 54 reduces the risk that an extracted signature will contain protocol-specific features that might not identify the same exploit transferred under a different protocol.

The structured packet sets 54 are received by a cluster analyzer 55 of the signature generation component 46 to group the structured packet sets 54 into common families or clusters. The cluster analyzer 55 separately analyzes a set of structured packet sets 54 identified to different connections 18 and a set of structured packet sets 54 identified to different sessions 20 to produce session clusters 62 and connection clusters 64 as will now be described.

Figure 4:
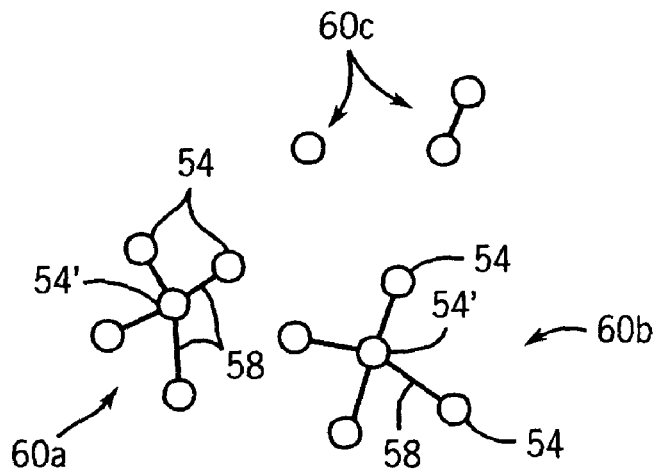
FIG. 4 is a graphical representation of the clustering process used by one of the modules of FIG. 3.

Referring now to FIG. 4, each connection or session structured packet set 54 defines a location in a multi-dimensional field, whose coordinates are the data of the structured packet set 54. Certain coordinates may be modified by the weights ascribed to the elements of the structured packet set 54 previously described. A given dimension of the multi-dimensional field, as a result of the abstraction of the data into the structured data packet, will be associated with a the function of the data in the session or connection.

A distance of separation described by edges 58 may be determined between structured packet sets 54 and this distance used to cluster structured packet sets 54 into families about central structured packet sets 54' according to their relative proximity in the multi-dimensional space. Shown are two clusters 60a and 60b (in a greatly simplified two dimensional space), each about a center, structured packet set 54' joined by edges 58.

The clustering may be performed by selecting one structured packet set 54 and linking it to other structured packet sets 54 only if the distance between them is less than a designated threshold. A non-center structured packet set 54 may only connect to a single center structured packet set 54' to which it has the strongest similarity. The clusters 60a or 60b, so formed, are star clusters, described in *"A Practical Clustering Algorithm For Static And Dynamic Information Organization"* by Javed Aslam, et al., ACM-SIAM Symposium on Discrete Algorithms (SODA), Baltimore Md., January 1999.

The distance defined by the edges 58 may be any of a number of common measurements of differences between vectors, however, the present invention considers "cosine similarity" and "hierarchical edit distance" to be preferred, the former if speed is essential and the latter if additional network or computational resources are available. Cosine similarity is described in *"Introduction to Modern Information Retrieval"* by G. Salton, et al., McGraw-Hill, 1983. Hierarchical edit distance computes the similarity between nodes as a function of the number of modifications needed to convert one node into the other, and thus extends the well known edit distance algorithm described in *"Introduction to Algorithms"* by Thomas H. Cormen, et al., MIT Press, $2^{nd}$ Edition, 2001. A wide variety of other cluster algorithms may be used, including k-means, and hierarchical algorithms.

Note that generally not all clusters 60a and 60b will have the same number of structured packet sets 54 and the wide variation in the data of any unrelated legitimate traffic 34 (usually packets 16 misdirected to darkspace addresses 32) will often produce isolated clusters 60c of few structured packet sets 54 which may be easily identified and disregarded by the present invention.

Referring again to FIG. 3, the session clusters 62 and connection clusters 64 formed by cluster analyzer 55 are next independently provided to a signature extractor 66. The signature extractor 66 analyzes the clusters 60 to generate signatures 23 in the form of finite-state machines and may use generalization algorithms to provide signatures that match malicious data that has not previously been observed. It will be understood that the signature extractor 66 may produce both session-level finite-state machines characterizing connection orderings and connection-level finite-state machines characterizing data transfer orderings, and the finite-state-machines may be hierarchical finite-state machines.

Figure 5A:
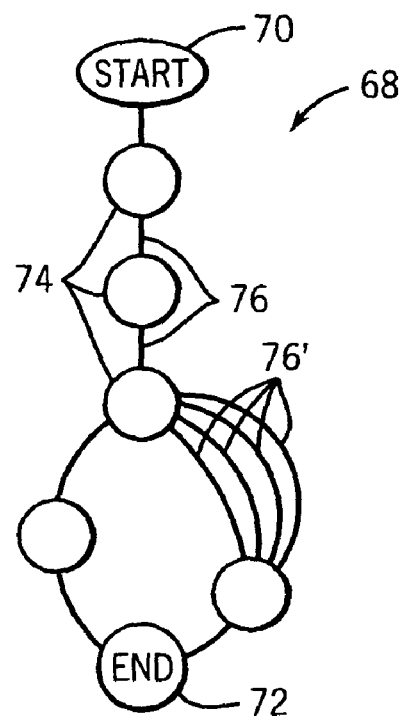
FIGS. 5a and 5b are diagrams of finite-state machine implementing signatures produced by the present invention.
Figure 5B:
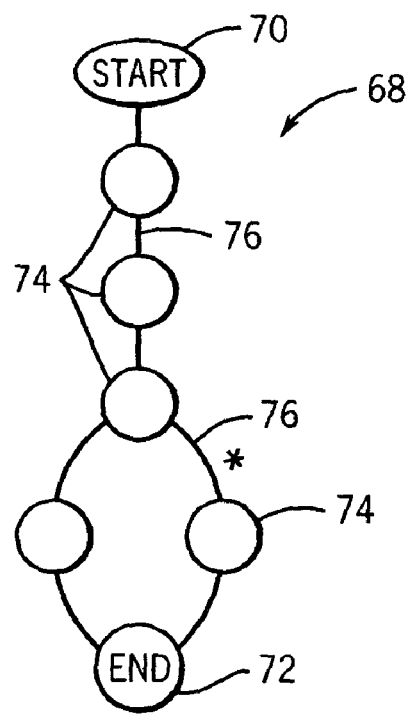

Referring to FIG. 5a, a finite-state machine will have a start state 70 and an end state 72, and a number of intermediate states 74 defined by the data of a structured packet set 54 of the cluster 60. Each of the states 74 are connected by edges 76 associated with unique data within the structured packet set 54. Branches in the finite-state machine will occur when different structure packets sets 54 have different data. Because the finite-state machine 68 is generated from many structured packet set 54 associated with each cluster, it will be common for states to have multiple edges 76 connecting them. A threshold may be established at which more than a given number of edges 76' between two states will be collapsed to a single edge designated with a wild card character as shown in FIG. 5b.

In a preferred embodiment, the finite-state machine 68 may be a probabilistic finite-state automaton (PFSA) accepting the data sequence contained in each of the structured packet sets 54 of a given cluster 60 and carrying edge weights corresponding to the number of times an edge 76 is traversed when accepting all structured packet sets 54 of the cluster 60 exactly once. Well known PFSA learning algorithms may then be used to generalize the data variations observed in the cluster to create a signature. In one version of the invention, HTTP connection level signatures were generalized with the "sk-strings" method described in *"The SK-Strings Method for Inferring PFSA,* by Anand V. Raman, et al., 14th International Conference on Machine Learning (ICML 97), Nashville Tenn., July 1997. Session level signatures were generalized with the sk-strings method and "simulated beam annealing" as described in *"Beam search and simulated beam annealing"* by Anand Raman et al., Technical Report February 1997, Department of Information Systems, Massey University, Palmerston North, New Zealand, 1997.

In a final step, signatures for each of the session clusters 62 and connection clusters 64 become the signatures 23 which may be provided to independent NIDS 22 or to a monitor incorporated into the present invention. The signatures 23 may be in the form of state diagrams as generated or may be readily converted (possibly with truncation) to regular expressions or static signatures for use with NIDS 22 that do not accommodate the state machine signature structure. The signatures may also be used for other purposes such as off-line analyses of data.

The sampling of malicious traffic 36 used by the present invention need not be obtained from darkspace addresses 32 but rather other techniques, such as anomaly detection, may be used to obtain malicious traffic for analysis of brightspace addresses 28. Alternatively, malicious traffic could be identified by techniques that flag sources that horizontally sweep address space and/or vertically scan several ports on a machine. A count of the number of rejected connection attempts could also be used. These approaches may also be used to supplement the use of darkspace addresses 32 to address intentional pollution of darkspace addresses by authors of malicious traffic.

The clustering provided by the cluster analyzer 55 may employ incremental clustering as new data arrives to operate in real-time on-line. Alternatively, signatures generated may be periodically uploaded to NIDS 22 as required. The semantic awareness of the present invention enables signatures to be generated for attacks in which the exploit is a small part of the entire payload or in multi-step attacks in which the exploit does not occur until the last step.

Generally, the signature generator 40 may be constructed in a modular fashion so that different cluster analyzers 55, signature extractor 66, for example, can be "plugged-in" as technology in this area improves or changes.

It is specifically intended that the present invention not be limited to the embodiments and illustrations contained herein, but include modified forms of those embodiments including portions of the embodiments and combinations of elements of different embodiments as come within the scope of the following claims.

We claim:

1. A signature generator to create signatures identifying malicious network traffic, the signature generator comprising:
   a network connection adapted for receiving data of malicious network traffic and substantially free of data of benign network traffic from a network wherein the network connection is to network darkspace, the network packets comprised of data packets associated with different communication units;
   a disambiguator receiving the malicious network traffic to convert obfuscated data of the malicious network traffic to a normalized form;
   a semantic encoder collecting the multiple data packets of the communication units into structured packets sets, a structure of the structured packet sets indicating normalized protocol function of the data packets of the communication units;
   a weighter assigning different weights to different portions of the structure of the structured packet sets;
   a cluster analyzer for grouping the data of malicious traffic received from the network connection into similar clusters the cluster analyzer determining distances among data according to values of the data of the weighted structured packets sets and grouping the data packets of different communications units into clusters based on this distance being below a threshold value; and
   a signature extractor operating on a given cluster to extract a previously unidentified signature, the signature representative of common features of the malicious data of the cluster, the signature extracted from the given cluster based on an assumption that the data is malicious and based on common features of the data within the given cluster.

2. The signature generator of claim 1 wherein the cluster analyzer groups the data according to a technique selected from the group consisting of a cosine similarity and a hierarchical edit distance.

3. The signature generator of claim 1 wherein the signature extractor operates only on clusters exceeding a predetermined threshold size.

4. The signature generator of claim 1 further including an aggregator collecting multiple data packets into communication units representing associated data packets under a communication protocol and wherein the signature extractor extracts the signatures based on similarities among different data packets in different communication units.

5. The signature generator of claim 4 wherein the communication units are connections.

6. The signature generator of claim 4 wherein the communication units are sessions.

7. The signature generator of claim 1 wherein the signature extractor creates finite-state machines describing the similar clusters and the extracted signatures are finite-state machines.

8. The signature generator of claim 7 wherein the finite-state machines are both session-level finite-state machines characterizing connection orderings and connection-level finite-state machines characterizing data transfer orderings, and the finite-state machines are hierarchical finite-state machines.

9. The signature generator of claim 1 wherein the signature extractor generalizes data included in a cluster to create signatures representative of malicious data not previously observed.

10. The signature generator of claim 7 wherein the signature extractor replaces state transitions having variability of over a predetermined amount with wildcard state transitions to produce the signature finite-state machines.

11. The signature generator of claim 7 wherein the signature extractor uses finite-state machine generalization algorithms to create signatures representative of malicious data not previously observed.

12. The signature generator of claim 4 further including a semantic encoder identifying a function of data of the data packets under a protocol and wherein the cluster analyzer uses the identification of the function of the data in establishing the similar clusters.

13. The signature generator of claim 12 wherein the semantic encoder further weights content of the data packets according to identified function and the cluster analyzer responds to the weighting in determining similar clusters.

14. The signature generator of claim 13 wherein relatively lower weights are ascribed to time stamps, sequence numbers and proxy cache headers.

15. The signature generator of claim 12 wherein the network connection operates according to a predetermined protocol and the semantic encoder identifies protocol elements according to the predetermined protocol.

16. The signature generator of claim 1 further including a disambiguater receiving the network traffic to resolve ambiguities in multiple data packets of the network traffic.

17. The signature generator of claim 16 wherein the ambiguities are selected from the group consisting of: data packets with errors, fragmented data packets, out-of-order data packets, and duplicate data packets.

18. The signature generator of claim 1 wherein the disambiguater normalizes protocol level ambiguities selected from the group consisting of: HTTP URL encodings, pipelined connections, and UNC path encodings in NetBIOS/SMB.

19. A method of generating signatures identifying malicious network traffic, the method comprising the steps of:
(a) creating a network connection adapted for receiving data of malicious network traffic and substantially free of data of benign network traffic from a network wherein the network connection is to network darkspace, the data comprised of data packets associated with different communication units;
(b) disambiguating the network traffic received over the network connection to resolve ambiguities in multiple data packets of the network traffic and to convert obfuscated data of the malicious network traffic to a normalized form;
(c) collecting the multiple data packets of the communication units into structured packets sets, a structure of the structured packet sets indicating normalized protocol function of the data packets of the communication units;
(d) assigning different weights to different portions of the structure of the structured packet sets;
(e) grouping the data of malicious traffic received from the network connection after the disambiguation into similar clusters by determining distances among data according to values of the data of the weighted structured packets sets and grouping the data packets of different communications units into clusters based on this distance being below a threshold value; and
(f) extracting a previously unidentified signature representative of common features of the malicious data of a cluster based on an assumption that the data is malicious and based on common features of the data within the one cluster, the signature matching to data of network traffic to distinguish malicious network traffic from network traffic that is not malicious; and
and further including the step of collecting multiple data packets into communication units representing associated data packets under a communication protocol and wherein the step of extracting the previously unidentified signature extracts the signature based on similarities among different data packets in different communication units within a given cluster.

* * * * *